(12) United States Patent
Tillmanns

(10) Patent No.: US 7,325,158 B2
(45) Date of Patent: Jan. 29, 2008

(54) METHOD AND APPARATUS FOR PROVIDING REDUNDANCY IN A DATA PROCESSING SYSTEM

(75) Inventor: Heinz Tillmanns, Stahnsdorf (DE)

(73) Assignee: Alcatel, Paris (FR)

( * ) Notice: Subject to any disclaimer, the term of this patent is extended or adjusted under 35 U.S.C. 154(b) by 1152 days.

(21) Appl. No.: 09/968,905

(22) Filed: Oct. 3, 2001

(65) Prior Publication Data

US 2002/0042822 A1    Apr. 11, 2002

(30) Foreign Application Priority Data

Oct. 5, 2000    (DE) ................................ 100 49 621

(51) Int. Cl.
*G06F 11/00*    (2006.01)
(52) U.S. Cl. ............................. 714/11; 714/12; 714/13
(58) Field of Classification Search ................. 714/11, 714/12, 13
See application file for complete search history.

(56) References Cited

U.S. PATENT DOCUMENTS

| | | |
|---|---|---|
| 5,408,649 A | 4/1995 | Beshears et al. |
| 5,608,865 A | 3/1997 | Midgely et al. |
| 5,621,884 A | 4/1997 | Beshears et al. |
| 5,664,090 A * | 9/1997 | Seki et al. ..................... 714/13 |
| 6,189,112 B1 * | 2/2001 | Slegel et al. .................. 714/10 |
| 6,269,442 B1 * | 7/2001 | Oberhauser et al. ........... 713/1 |
| 6,421,741 B1 * | 7/2002 | Minyard ...................... 714/12 |
| 6,625,750 B1 * | 9/2003 | Duso et al. .................... 714/11 |

FOREIGN PATENT DOCUMENTS

DE    32 15 177 A1    10/1983

* cited by examiner

*Primary Examiner*—Robert Beausoliel
*Assistant Examiner*—Joseph D Manoskey
(74) *Attorney, Agent, or Firm*—Sughrue Mion Pllc.

(57) ABSTRACT

A method for operating a data processing system and a redundancy data processing unit for executing the method is disclosed. Two or more active data processing units are assigned to each redundancy data processing unit. The redundancy data processing unit stores a copy of the active data stock of each active data processing unit assigned to it. Each of the active data processing units periodically ascertains changes in its current active data relative to the copy of its active data stored in the redundancy data processing unit and transfers correction data describing any changes. By means of the transferred correction data, the redundancy data processing unit updates its stored copy of the active data and, in the event of the failure of an assigned active data processing unit, assumes the function of the failed data processing unit based upon its stored data copy from the failed data processing unit.

11 Claims, 2 Drawing Sheets

METHOD AND APPARATUS FOR PROVIDING REDUNDANCY IN A DATA PROCESSING SYSTEM

BACKGROUND OF THE INVENTION

The invention is based on a priority application DE 100 49 621.0-53 which is hereby incorporated by reference. The invention concerns a method for operating a data processing system with several data processing units, a redundancy data processing unit for a data processing system with several data processing units, a data processing unit for a data processing system and a data processing system with two or more active processing units and with at least one redundancy data processing unit.

In data processing systems, there is quite often a requirement to ensure high availability of the overall system.

The invention is based on a solution approach known in the field of network management systems:

A redundancy data processing unit is installed in addition to each active data processing unit whose failure has more extensive consequences for the functioning of the overall system. The redundancy data processing unit receives the same data as the active data processing unit. In respect of communication, the active data processing unit and the redundancy data processing unit form a unit. The redundancy data processing unit operates in "hot stand-by mode", i.e., it performs in parallel the same functions as the active data processing unit, and thus receives the same input data and produces the same output data. If a fault or the failure of the active data processing unit is detected, the data processing unit uses the output data of the redundancy data processing unit instead of the output data of the active data processing unit.

A disadvantage of this approach is that a failure of the communications link to the active data processing unit also means a failure of the communications link to the redundancy data processing unit.

SUMMARY OF THE INVENTION

The object of the invention, therefore, is to improve the failure safety of a data processing system with several active data processing units.

This object is achieved by a method for operating a data processing system with several data processing units respectively assigned to two or more active data processing units to a redundancy data processing unit of the data processing system; the redundancy data processing unit respectively stores a copy of the active data stock of each active data processing unit assigned to it; each of the two or more active data processing units periodically ascertains the change in its current active data stock in relation to the copy of its active data stock stored in the assigned redundancy data processing unit and transfers to the assigned redundancy data processing unit correction data describing this change; by means of this transferred correction data, the redundancy data processing unit updates its stored copy of the active data stock of the respective transferring active data processing unit; and, in the event of the failure of an active data processing unit assigned to it, the redundancy data processing unit assumes the function of this failed data processing unit on the basis of its stored copy of the active data stock of the failed data processing unit. This object is achieved, by a redundancy data processing unit for a data processing system with several data processing units, wherein the redundancy data processing unit comprising a databank in which there is respectively stored a copy of the active data stock of two or more active data processing units of the data processing system to which the redundancy data processing unit is assigned, the redundancy data processing unit is designed so that it updates the copies, stored in the databank, of the active data stock of the active data processing units to which it is assigned by means of correction data transferred to it by each of the respective assigned active data processing units and which is periodically ascertained by the respective assigned active data processing units from the change in their current active data stock in relation to the copy of their active data stock stored in the redundancy data processing unit, and the redundancy data processing unit is additionally designed so that, in the event of the failure of an active data processing unit assigned to it, it assumes the function of this failed data processing unit on the basis of its stored copy of the active data stock of the failed data processing unit.

This object is achieved by a data processing unit for a data processing system with several data processing units and with at least one redundancy data processing unit assigned to the data processing unit, wherein the data processing unit is designed so that it periodically ascertains the change in its current active data stock in relation to a copy of its active data stock stored in the assigned redundancy data processing unit and transfers to the assigned redundancy data processing unit correction data, describing this change, for the purpose of updating the copy of its active data stock stored in the assigned redundancy data processing unit.

This object is achieved by a data processing system with two or more active data processing units and with at least one redundancy data processing unit, wherein the redundancy data processing unit is provided with a databank in which there is respectively stored a copy of the active data stock of the two or more active data processing units of the data processing system to which the redundancy data processing unit is assigned as a redundancy data processing unit, the two or more active data processing units are each designed so that they periodically ascertain the change in their current active data stock in relation to the copy of their active data stock stored in the assigned redundancy data processing unit and transfer correction data, describing this change, to the assigned redundancy data processing unit, the redundancy data processing unit is designed so that, by means of the correction data transferred by the assigned two or more active data processing units, it updates its stored copy of the active data stock of the respective transferring active data processing unit, and the redundancy data processing unit is additionally designed so that, in the event of the failure of an active data processing unit assigned to it, it assumes the function of this failed data processing unit on the basis of its stored copy of the active data stock of the failed data processing unit.

This invention is based on the concept that a redundancy data processing unit is responsible for several active data processing units. The redundancy data processing unit no longer operates in "hot stand-by" mode and also does not receive the input data of the assigned data processing units. Rather, it holds a copy of the active data stock of the assigned data processing units, this copy being updated by means of correction data regularly transferred by the assigned data processing units. In the event of a failure of an assigned active data processing unit, its function is then started from the copy of the active data stock of this data processing unit.

The advantage of the invention is that it is possible to protect against even the failure of the communications links to an active data processing unit: redundancy data processing units and active data processing units can be spatially distributed.

A further advantage of the invention is that the failure safety of the data processing system can be thereby achieved in a cost-effective manner: only one redundancy data processing unit is required for several active data processing units. The redundancy data processing unit only operates the function of an assigned active data processing unit upon failure of the latter and, prior to that, requires only small processing capacities. In respect of processing capacity, therefore, even on assumption of the role of a redundancy data processing unit for a multiplicity of data processing units, it does not need to be rated more highly than a single data processing unit. Moreover, only a small load is imposed on the communications network by the communication between the active data processing units and the redundancy data processing units.

A further advantage of the invention is that, through the alteration of few parameters, the invention can be adapted to very widely varying system requirements. Such parameters are, for example, transfer rate of the correction data, number of data processing units assigned to a redundancy data processing unit, number of redundancy data processing units assigned to a data processing unit, rating of the redundancy data processing units.

These advantages are partly at the cost of the fact that it can no longer be assured that the redundancy data processing unit loads at the current status of the assigned active data processing unit. This effect, however, can be compensated through protective measures of higher program levels.

Advantageous embodiments of the invention are disclosed by the sub-claims.

BRIEF DESCRIPTION OF THE DRAWINGS

The invention is explained below with reference to several embodiment examples and with the aid of the accompanying drawings.

DETAILED DESCRIPTION

Figure 1:
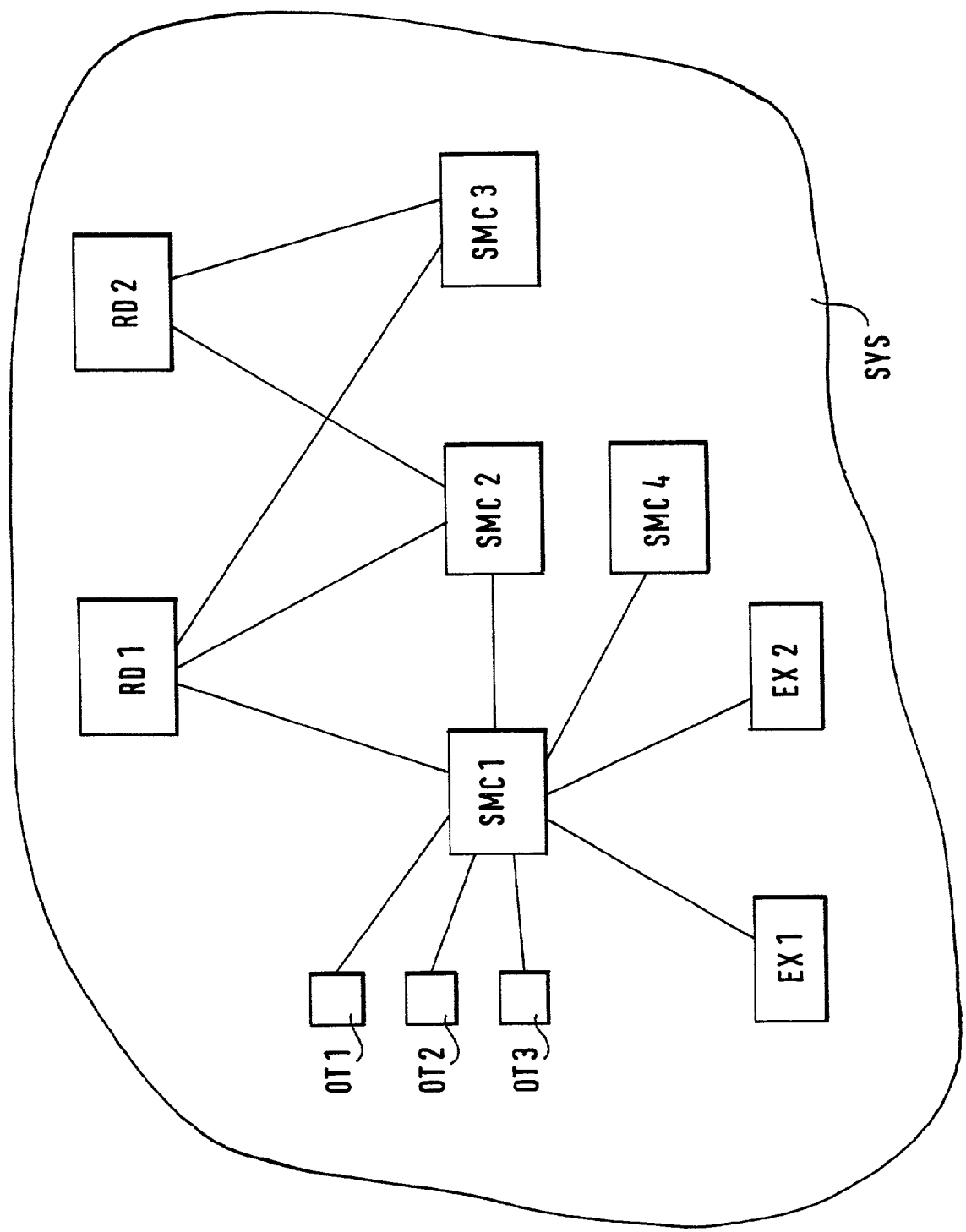
FIG. 1 shows a block diagram of a data processing system according to the invention.

FIG. 1 shows a data processing system SYS with several data processing units SMC1 to SMC4, EX1, EX2, OT1 to OT3, RD1, RD2.

The data processing system SYS is a network management system. It is also possible, however, that the data processing system SYS is a different type of data processing system, in which high availability is required. Such data processing systems can be used, for example, for monitoring production processes, traffic networks or satellite networks.

Each of the data processing units SMC1 to SMC4, EX1, EX2, OT1 to OT3, RD1, RD2 is a functional unit which processes data. This functional unit comprises a hardware platform which consists of one or more interconnected computers and may also have peripheral components. In addition, it comprises a software platform consisting, for example, of an operating system and, running on it, one or more application programs which process data.

Each of the data processing units SMC1 to SMC4 represents network management servers which perform network management functions and which each manage one or more network elements. The data processing units EX1 to EX2 represent network elements. The data processing units OT1 to OT3 represent terminals by means of which network operators monitor and control the management of the network elements through network management cervers. The data processing units RD1 to RD2 represent redundancy data processing units. The number of data processing units of each type present in the data processing system SYS is selected by way of example.

The data processing unit SMC1 communicates with the data processing units OT1 to OT3, EX1, EX2, RD1, SMC2, the data processing unit SMC2 communicates with the data processing units SMC1, RD1 and RD2, and the data processing unit SMC3 communicates with the data processing units RD1 and RD2. This communication is in this case effected via a signalling network of a telecommunications network or via a data network, for example, an IP network (IP=internet protocol).

The active data processing units SMC1 to SMC3, and SMC2 and SMC3, are assigned to the redundancy data processing units RD1 and RD2. The data processing unit RD1 thus performs the role of a redundancy data processing unit for each of the data processing units SMC1 to SMC3 and the data processing unit RD2 performs the role of a redundancy data processing unit for each of the data processing units SMC2 and SMC3. In this context, the term redundancy data processing unit means that this data processing unit can assume the role of another data processing unit which, due to a failure, for example, changes from an active state to a non-active state.

The invention is described below with reference to the redundancy concept for the data processing units SMC1 to SMC3:

The data processing units SMC1 to SMC3 represent active data processing units of the data processing system SYS. Several active data processing units of the data processing systems SYS, namely, the data processing units SMC1 to SMC3, and SMC2 and SMC3, are respectively assigned of the redundancy data processing units RD1 and RD2 of the data processing system SYS. Each of the data processing units RD1 and RD2 thus performs the role of a redundancy data processing unit for this assigned data processing unit. As shown by FIG. 1, it is also possible for two or more redundancy data processing units to be assigned to one of the active data processing units, for example, the data processing units SMC2 and SMC3. Obviously, it is also possible for further data processing units to be assigned to the redundancy data processing units RD1 or RD2.

Each of the redundancy data processing units RD1 and RD2 stores a copy of the active data stock of each of the active data processing units SMC1 to SMC3 assigned to it. Each of the active data processing units SMC1 to SMC3 periodically ascertains the change in its current active data stock in relation to the copy of its active data stock stored in the assigned redundancy data processing unit RD1 and RD2 and transfers to the assigned redundancy data processing unit correction data describing this change. The data processing unit SMC1 thus sends this correction data to the redundancy data processing unit RD1, and the data processing units SMC2 and SMC3 each send this correction data to both redundancy data processing units RD1 and RD2.

By means of this transferred correction data, the redundancy data processing units RD1 and RD2 each update their stored copy of the active data stock of the respective transferring active data processing units SMC1 to SMC3. In the event of a failure of an active data processing unit assigned to them, the redundancy data processing units RD1 and RD2 each assume the function of that failed data processing unit on the basis of their stored copy of the active data stock of the failed data processing unit. In this case, the redundancy data processing unit RD1 thus assumes the function of the data processing unit SMC1, and the function of the data processing units SMC2 and SMC3 is assumed by the redundancy data processing unit RD1 or the redundancy data processing unit RD2.

In addition, in the event of the failure of one of the active data processing units SMC1 to SMC3, the communications links between data processing units of the data processing system SYS and the failed data processing unit are switched over to the redundancy data processing unit to which the failed data processing unit is assigned. This switchover can be initiated by the data processing units affected by the failure or the redundancy data processing units themselves or, alternatively, by another unit of the data processing system SYS. This rerouting can also be effected in a transparent manner for the data processing units involved, for example, through the changing of routing tables.

The detailed structure of the data processing units SMC1 to SMC3 and of the redundancy data processing units RD1 and RD2 is described below with reference to the data processing unit SMC1 and the redundancy data processing unit RD1.

Figure 2:
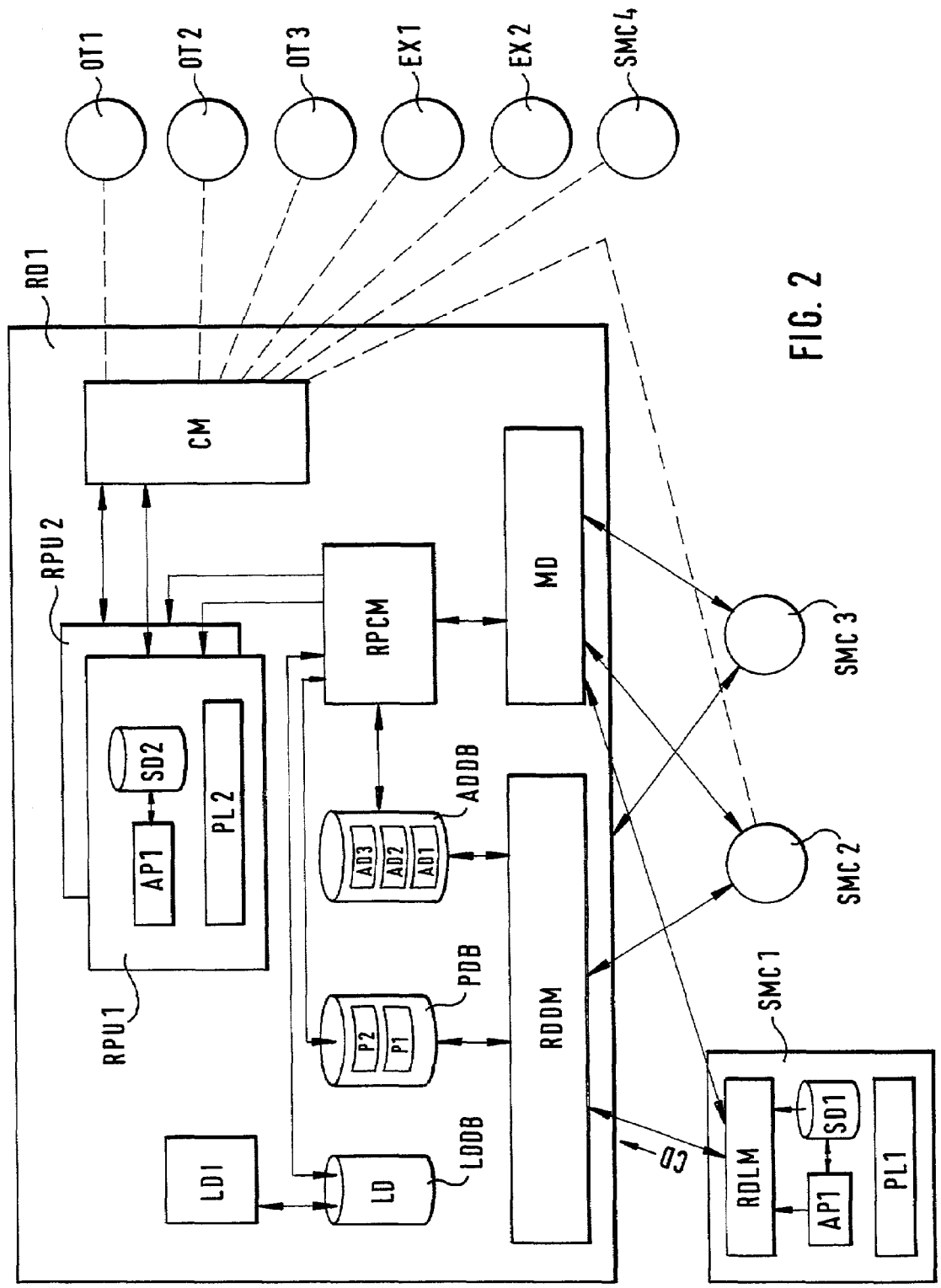
FIG. 2 shows a functional representation of a section from the data processing system according to the invention shown in FIG. 1.

FIG. 2 shows the data processing units SMC1 to SMC4, EX1, EX2, OT1 to OT3 and RD1.

In respect of function, the data processing unit SMC1 comprises a system platform PL1, data SD1, and two application programs AP1 and RDLM.

The system platform PL1 comprises the necessary hardware and software components required for running the application programs AP1 and RDLM. Thus, for example, the system platform PL1 comprises a computer or several interconnected computers which, with peripheral components, are required for communication with the data processing units OT1 to OT3, SMC2, SMC4 and RD1. The system platform PL1 additionally comprises an operating system and may comprise middleware components which enable the application programs AP1 and RDLM to run on the hardware components of the system platform PL1.

The application program AP1 forms a functional unit which performs and controls the functions of the data processing unit SMC1 within the data processing system SYS and thus performs the actual function of the data processing unit SMC1 as a network management server. When running, the application program AP1 accesses the data SD1. The data SD1 thus represents the data stock of the data processing unit SMC1 required for the network management server function.

The application program RDLM forms a functional unit which maintains contact with the assigned redundancy data processing unit RD1 and executes all functions which are to be performed within the data processing unit SMC1 in connection with the redundancy concept.

The application program RDLM periodically determines the change in the current active data stock of the data processing unit SMC1 in relation to a copy of its active data stock stored in the assigned redundancy data processing unit RD1. The active data stock, the change in which is recorded by the application program RDLM, can be identical to the data SD1, i.e., comprise all data required for actively performing the actual function of the data processing unit SMC1. It is obviously also possible for the active data, the change in which is recorded by the application program RDLM, to comprise the entire data stock of the data processing unit SMC1.

In addition, it is often advantageous for the active data stock, the change in which is recorded by the application program RDLM, to be only a partial quantity of the data SD1. For example, the data SD1 of the data processing unit SMC1 can be divided into site-specific data and non-site-specific data. Even if the site-specific data is required for performing the function of the application program AP1, it is advantageous if its change is not recorded and no copy of this data is stored in the redundancy data processing unit RD1 since, upon the assumption of the function of the data processing unit SMC1 by the redundancy data processing unit RD1, this data must be specially formed for the site of the redundancy data processing unit RD1. The active data stock of the data processing unit SMC1 is thus formed only from the non-site-specific data of the data processing unit SMC1 and only this data is included in the determination of the correction data CD.

In the initialization phase, the application program RDLM ascertains the part of the data stock of the data processing unit SMC 1 which forms the active data stock of the data processing unit SMC1. The active data stock of the data processing unit SMC1 is thus formed, for example, from a partial quantity of the data SD1. This data can be selected automatically by means of predefined filter criteria or on the basis of a predefined selection. A copy of the ascertained data stock is then transferred to the data processing unit RD1.

In the following operating phase, the application program RDLM periodically determines correction data CD. For this purpose, it compares the current active data stock of the data processing unit SMC1 with the active data stock of the data processing unit SMC1 at the time of the last determination of correction data CD and from this determines the change in its current active data stock in relation to the copy of its active data stock stored in the assigned redundancy data processing unit RD1. It is also possible for the application program RDLM to continuously monitor the active data stock of the data processing unit SMC1 and record each change in the active data. The recording, possibly in processed form, between two correction data transfer times then forms the correction data CD to be transferred.

It is obviously also possible for a copy of the active data stock of the data processing unit SMC1 to be transferred to the redundancy data processing unit RD1 not only in the initialization phase, but also again at a later time in the operating phase, and also repeated. This can reduce the accumulation of errors.

Following determination of the correction data CD describing this change, the application program RDLM initiates the transfer of the correction data CD to the assigned redundancy data processing unit RD1 for the purpose of updating the copy of the active stock of the data processing unit SMC1 stored in the assigned redundancy data processing unit RD1. If more than one redundancy unit is assigned to the data processing unit SMC1, the correction data CD are transferred to all of these assigned redundancy data processing units. It is obviously also possible for the period of determination and transfer of correction data to differ from one redundancy data processing unit to another.

It is furthermore advantageous that the application program RDLM monitors the changing of the application program AP1 and informs the assigned redundancy data processing unit RD1 through a changing of the program version of the application program AP1. It is also possible for the application program RDLM to transfer to the redundancy data processing unit RD1 in the initialization phase a copy of the current program version of the application program AP1 or an identifier for this program version. The assigned redundancy data processing unit RD1 can be notified of subsequent changes in like manner.

The redundancy data processing unit RD1 comprises several databanks LDDB, PDB and ADDB and several functional units RDDM, MD, LDI, RPCM, CM, RPU1 and RPU2.

Stored in the databank ADDB are a copy of the active data stock of each of two or more active data processing units of the data processing system SYS to which the redundancy data processing unit RDI is assigned. The data stocks AD1, AD2 and AD3 each represent a copy of the active data stock of the data processing units SMC1, SMC2 and SCM3 respectively.

Local data LD of the redundancy data processing unit RD1 is stored in the databank LDDB.

Stored in the databank PDB are program versions of application programs which are used in data processing units to which the redundancy data processing unit RD1 is assigned as a redundancy data processing unit. For example, there are stored in the databank PDB program versions P1 and P2, which are used by the data processing units SMC1 to SMC2 as application programs for performance of the function of these data processing units.

It is also possible to omit the databanks LDDB and PDB.

The functional units RDDM, MD, LDI, RPCM, CM, RPU1 and RPU2 are each formed, for example, by an (application) program which runs on the system platform of the redundancy data processing unit RD1. In particular, the functional units RDDM, MD, LDI, RPCM, CM, RPU1 and RPU2 perform the following functions:

The functional unit RDDM updates the copies, stored in the databank ADDB, of the active data stocks AD1 to AD3 of the active data processing units SMC1 to SMC3 to which the redundancy data processing unit RD1 is assigned as a redundancy data processing unit. For the purpose of such updating, it evaluates correction data which is transferred to it by the respective assigned active data processing unit SMC1 to SMC3 and which is periodically determined by the respective assigned active data processing units SMC1 to SMC3 from the change in their current active data stock in relation to the copy of their active data stock AD1 to AD3 stored in the data bank ADDB of the redundancy data processing unit RD1. Such correction data are, for example, the correction data CD which is determined by the data processing unit SMC1 in the manner described above. Each of the changes in the respective active data stock specified in the correction data is then made by the functional unit RDDM to copies, stored in the databank ADDB, of the active data stocks AD1, AD3, the latter being thereby updated.

Furthermore, it is possible for the functional unit RDDM to receive in an initialization phase, or also in the operating phase, full or partial copies of the active data stocks AD1 to AD3 of the data processing units SMC1 to SMC3 assigned to it and then to store these in the databank ADDB.

In like manner, it is possible for the functional unit RDDM to receive in an initialization phase, or also in the operating phase, copies of the program versions P1 and P2 of the data processing units SMC1 to SMC3 assigned to it and then to store these in the databank PDB. In particular, this can be the case if the program version of one of the data processing units SMC1 to SMC3 changes.

Furthermore, it is possible for the active data processing units SMC1 to SMC3 to be classified, in the redundancy data processing unit RD1 to which they are assigned, in relation to the program versions currently used by them and for a copy of the program version currently assigned to this classification to be stored in the databank PDB of the redundancy data processing unit RD1 for each classification of active data processing units. Thus, for example, the data processing units SMC1 and SMC2 are assigned to a first classification of active data processing units to which the program version P1 is assigned. Both data processing units SMC1 and SMC2 thus execute the same program and thereby perform a similar function. The data processing unit SMC3 is assigned to a second classification of active data processing units to which the program version P2 is assigned.

In the initialization phase of the data processing system SYS, the functional unit LDI determines its own site-specific data LD of the redundancy data processing unit RD1 and stores this in the databank LD.

The functional unit MD monitors the function of the active data processing units SMC1 to SMC3 assigned to it and the communications link to the active data processing units SMC1 to SMC3. For this purpose, for example, it sends periodic monitoring messages to the data processing units SMC1 to SMC3 and monitors the entry of response messages of the data processing units SMC1 to SMC3 to these monitoring messages. In the data processing unit SMC1, for example, the procedure to be executed in the data processing units SMC1 to SMC3 for this purpose is executed by the application program RDLM.

If the functional unit MD ascertains the failure of one of the data processing units SMC1 to SMC3 or of the communications link to one of the data processing units SMC1 to SMC3, it sends a corresponding trigger message to the functional unit RPCM.

It is obviously also possible for the ascertainment of the failure of one of the data processing units, to which the redundancy data processing unit RD1 is assigned as a redundancy data processing unit, to be effected by another component of the data processing system SYS, thereby permitting the omission of the functional unit MD. For example, such a failure of one of the data processing units, which works together with such a data processing unit, is ascertained. This data processing unit then sends the trigger message to the functional unit RPCM.

In the event of the failure of an active data processing unit assigned to the redundancy data processing unit RD1, the functional unit RPCM initializes the assumption of the function of this failed data processing unit on the basis of the copy of the active data stock of the failed data processing unit stored in the databank ADDB. For this purpose, it initializes within the redundancy data processing unit RD1 a functional unit which performs the function of the failed data processing unit on the basis of the copy of the data stock of the failed data processing unit stored in the databank ADDB. In addition, the functional unit RPCM controls and monitors the life cycle of this functional unit initialized by it.

Shown in FIG. 2 by way of example are two functional units, namely, the functional units RPU1 and RPU2, which represent such functional units initialized by the functional unit RPCM. The functional unit RPU1 comprises a software platform PL2, an application program AP2 and a data stock SD2. The application program AP2 runs using the data stock SD2 on the software platform PL2 and thus performs the function of the failed data processing unit.

For the purpose of initializing the functional unit RPU1, the functional unit RPCM ascertains the application program and the data stock with which the functional unit RPU1 is to be initialized. For this purpose, the functional unit RPCM ascertains the program version assigned to the failed data processing unit and activates it with the stored copy of the active data stock of the failed data processing unit.

For example, in the event of the failure of the data processing unit SMC1, the functional unit RPCM ascertains the program version of the data processing unit SMC1, namely, the program version P1, and the copy of the active data stock of the data processing unit SMC1, namely, the data stock AD1, which is stored in the redundancy data processing unit RD1. It then copies the ascertained program version P1 from the databank PDB and the active data stock from the databank ADDB into the functional unit.

It is also possible for the data record SD2 to comprise further data in addition to the active data stock AD1. Such data can be, for example, site-specific data of the redundancy data processing unit RD1. The functional unit RPCM extracts from the databank LDDB, for example, the data LD, integrates this data into the data stock AD1 and stores the resultant data record as a data stock SD2 in the functional unit RPU1.

In the event of the failure of an active data processing unit, the functional unit CM maintains the communications links between data processing units of the data processing system and the functional units RPU1 and RPU2 assuming the function of the failed data processing unit. The basis of this is that, in the event of the failure of an active data processing unit, the communications links between data processing units of the data processing system and the failed data processing unit are switched over to the redundancy data processing unit to which the failed data processing unit is assigned. These switched-over communications links are operated by the functional unit CM.

In the event of the failure of the data processing unit SMC1 and the assumption of the function of the data processing unit SMC1 by the functional unit RPU1, the functional unit CM thus maintains the communications links between the functional unit RPU1 and the data processing units OT1 to OT3, EX1, EX2, SMC2, SMC4 which previously communicated with the data processing unit SMC1.

The invention claimed is:

1. A method for operating a data processing system, the method comprising:
    assigning two or more active data processing units to a redundancy data processing unit of the data processing system;
    storing active data stock, wherein the redundancy data processing unit respectively stores an active data stock copy of each active data processing unit assigned to it;
    periodically determining if changes exist between current active data stock and the copy of active data stock, wherein each of the data processing units periodically ascertains if changes exist between its current active data stock and its respective active data stock copy stored in the redundancy data processing unit and transfers correction data to the assigned redundancy data processing unit describing any changes;
    updating stored copies of active data stock, wherein the redundancy data processing unit updates its active data stock copy of the respective transferring active data processing unit via the transferred correction data; and
    assuming the functions of a failed active data processing unit, wherein the redundancy data processing unit assumes the functions of the failed data processing unit based upon the stored active data stock copy of the failed data processing unit,
    wherein the method further comprises
    storing, in the redundancy data processing unit, copies of the current program versions of the active data processing units assigned to the redundancy data processing unit.

2. The method according to claim 1, wherein the method further comprises:
    assigning two or more redundancy data processing units to one or more active data processing units, and
    each active data processing unit transfers correction data to each of the assigned redundancy data processing units.

3. The method according to claim 1, wherein the method further comprises:
    classifying two or more active data processing units in the redundancy data processing unit to which they are assigned in relation to the program versions currently used by them; and
    for each classification of active data processing units, the redundancy data processing unit stores a copy of the program version assigned to this classification.

4. The method according to claim 1, wherein the redundancy data processing unit monitors the function of the active data processing units assigned to it.

5. The method according to claim 1, further comprising:
    switching communications links between data processing units of the data processing system in the event of the failure of an active data processing unit, and
    switching the failed data processing unit over to the redundancy data processing unit to which the failed data processing unit is assigned.

6. The method according to claim 5, wherein when the data processing units of the data processing system involved in the these communications links ascertain a failure of an active data processing unit, the switchover of the communications links is initiated.

7. The method according to claim 1, wherein said correction data includes data regarding changes to said current program versions.

8. A method for operating a data processing system, the method comprising:
    assigning two or more active data processing units to a redundancy data processing unit of the data processing system;
    storing active data stock, wherein the redundancy data processing unit respectively stores an active data stock copy of each active data processing unit assigned to it;
    periodically determining if changes exist between current active data stock and the copy of active data stock, wherein each of the data processing units periodically ascertains if changes exist between its current active data stock and its respective active data stock copy stored in the redundancy data processing unit and transfers correction data to the assigned redundancy data processing unit describing any changes;
    updating stored copies of active data stock, wherein the redundancy data processing unit updates its active data stock copy of the respective transferring active data processing unit via the transferred correction data; and
    assuming the functions of a failed active data processing unit, wherein the redundancy data processing unit assumes the functions of the failed data processing unit based upon the stored active data stock copy of the failed data processing unit, wherein the method further comprises:

ascertaining a program version assigned to a failed data processing unit to assume the function of the failed data processing unit, and activating the program version with the stored active data stock copy of the failed data processing unit.

9. A method for operating a data processing system, the method comprising:

assigning two or more active data processing units to a redundancy data processing unit of the data processing system;

storing active data stock, wherein the redundancy data processing unit respectively stores an active data stock copy of each active data processing unit assigned to it;

periodically determining if changes exist between current active data stock and the copy of active data stock, wherein each of the data processing units periodically ascertains if changes exist between its current active data stock and its respective active data stock copy stored in the redundancy data processing unit and transfers correction data to the assigned redundancy data processing unit describing any changes;

updating stored copies of active data stock, wherein the redundancy data processing unit updates its active data stock copy of the respective transferring active data processing unit via the transferred correction data; and assuming the functions of a failed active data processing unit, wherein the redundancy data processing unit assumes the functions of the failed data processing unit based upon the stored active data stock copy of the failed data processing unit, wherein the method further comprises:

dividing the active data stock of the two or more active data processing units into site-specific data and non-site-specific data; and only non-site-specific data forms the active data stock of the data processing unit and is included in the determination of the correction data.

10. A method for operating a data processing system, the method comprising:

assigning two or more active data processing units to a redundancy data processing unit of the data processing system;

storing active data stock, wherein the redundancy data processing unit respectively stores an active data stock copy of each active data processing unit assigned to it;

periodically determining if changes exist between current active data stock and the copy of active data stock, wherein each of the data processing units periodically ascertains if changes exist between its current active data stock and its respective active data stock copy stored in the redundancy data processing unit and transfers correction data to the assigned redundancy data processing unit describing any changes;

updating stored copies of active data stock, wherein the redundancy data processing unit updates its active data stock copy of the respective transferring active data processing unit via the transferred correction data; and assuming the functions of a failed active data processing unit, wherein the redundancy data processing unit assumes the functions of the failed data processing unit based upon the stored active data stock copy of the failed data processing unit, wherein the redundancy data processing unit stores its own site-specific data.

11. A method for operating a data processing system, the method comprising:

assigning two or more active data processing units to a redundancy data processing unit of the data processing system;

storing active data stock, wherein the redundancy data processing unit respectively stores an active data stock copy of each active data processing unit assigned to it;

periodically determining if changes exist between current active data stock and the copy of active data stock, wherein each of the data processing units periodically ascertains if changes exist between its current active data stock and its respective active data stock copy stored in the redundancy data processing unit and transfers correction data to the assigned redundancy data processing unit describing any changes;

updating stored copies of active data stock, wherein the redundancy data processing unit updates its active data stock copy of the respective transferring active data processing unit via the transferred correction data; and assuming the functions of a failed active data processing unit, wherein the redundancy data processing unit assumes the functions of the failed data processing unit based upon the stored active data stock copy of the failed data processing unit, wherein the method further comprises:

ascertaining a program version assigned to a failed data processing unit to assume the function of the failed data processing unit, and activating the program version with the stored active data stock copy of the failed data processing unit and site-specific data of the redundancy data processing unit.

* * * * *